(No Model.)

J. W. CLOUD.
DEVICE FOR STOPPING RAILWAY TRAINS.

No. 291,495. Patented Jan. 8, 1884.

WITNESSES:
Chas. T. Williams
R. J. Childs

INVENTOR
John W. Cloud
by his attorney
Francis T. Chambers

United States Patent Office.

JOHN WILLS CLOUD, OF ALTOONA, PENNSYLVANIA.

DEVICE FOR STOPPING RAILWAY-TRAINS.

SPECIFICATION forming part of Letters Patent No. 291,485, dated January 8, 1884.

Application filed June 23, 1883. (No model.)

*To all whom it may concern:*

Be it known that I, JOHN W. CLOUD, of Altoona, county of Blair, and State of Pennsylvania, have invented a certain new and useful Device for Stopping Railway-Trains, of which the following is a full and accurate description, reference being had to the accompanying drawings, which form a part of this specification.

The object of my invention is to provide a device which may be attached to either end of a train of cars or permanently fixed at the end of a track to serve as a bumper, and which device shall oppose to a rapidly-moving train striking it a gradually-increasing resistance extending over a considerable distance, so that the momentum of the moving train may be gradually and without harmful shock checked, and in the case of a rear-end collision the stationary train caused to move forward by the increasing pressure at its end.

My invention accordingly consists of a bumper arranged to offer a gradually-increasing resistance to a moving train, and constructed and adapted for use in the manner hereinafter described.

Figure 1:
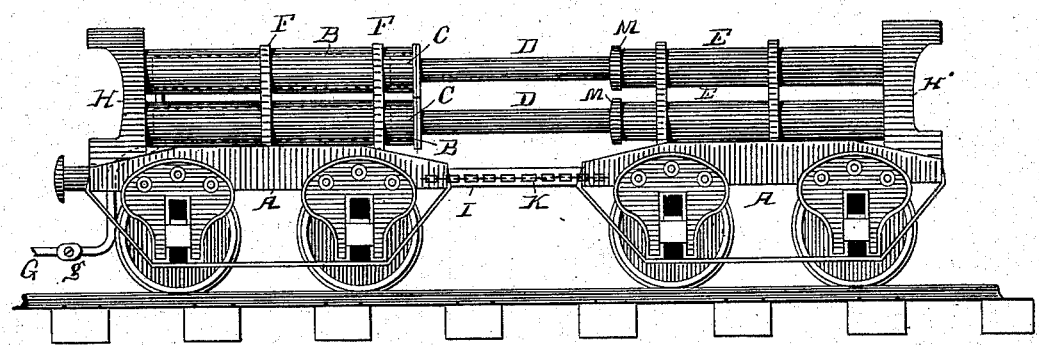
Figure 2:
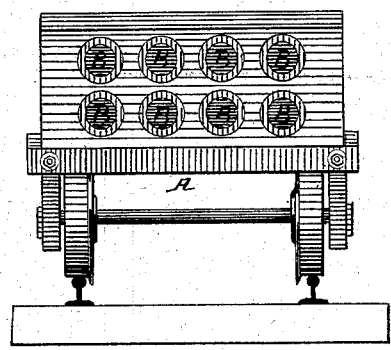
Figure 3:
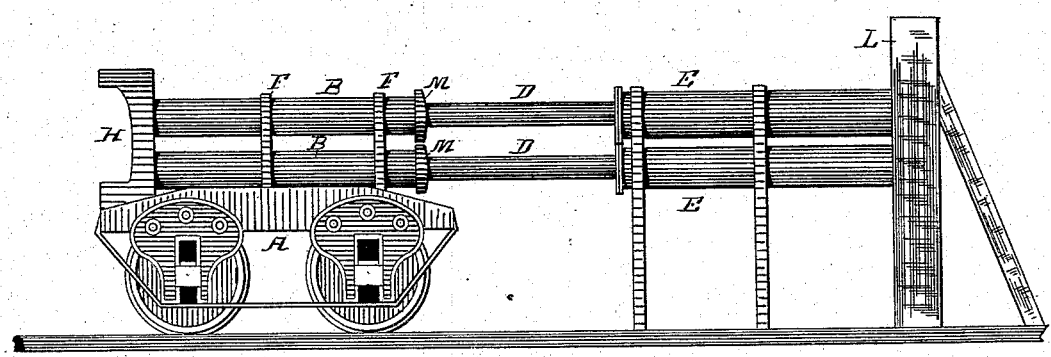

Reference being now had to the drawings, Figure 1 is a side view of my device adapted for use at the end of a railroad-train. Fig. 2 is a sectional end view of the same, the section being taken through the truck A. Fig. 3 is a side view of my device adapted for use as a bumper-block at the end of a track.

A A' are trucks, which may be constructed in any usual or convenient way.

B B B, &c., are strong smooth cylinders, of which there may be any desired number. These cylinders are secured as firmly as possible to the truck A, so that they shall always be substantially parallel with the track. Where more than one cylinder is used, I prefer that they should all be connected together at their ends, near H.

C C, &c., are pistons or plungers, which fit closely into the cylinders B; and D D, &c., are the piston or plunger rods, which should be made strong and rigid.

E E, &c., are prolongations of the piston-rods D, or devices to which such rods may be secured, and by means of which they are kept in proper alignment with the cylinders and securely connected either with the truck A' or the stationary bumper L, Fig. 3. The piston-rods D, I make somewhat shorter than the cylinders B, and provide them with rubber or other elastic washers M M, &c., the object being that the air in the cylinders shall not be compressed beyond the limit of safety, and that the ends of the piston-rods may not strike too sharp a blow against the end of the cylinders if pressed home with rapidity and violence.

When feasible, I prefer to connect the end of the cylinders B with the air-hose which actuates the brakes, which may be done by means of the pipe G, which I provide with a valve, $g$, which retains the air in the cylinders at the same degree of compression. The piston-rods D form the principal connection between the trucks A A' or the truck A and the bumper L, as shown in Fig. 3; but I prefer to connect the trucks together by means of a chain or chains, K, by means of which the forward truck will draw the rear truck. I also prefer to connect the two trucks together by a light wooden frame, I, or some such device which will keep the trucks at the same distance from each other, and the pistons drawn out to their fullest extent at all times, except when a blow or push is given to the hind truck of sufficient force to require the aid of my device to render it harmless, in which case the frame may be either made so that it will break, or it may be made so as to slide, and secured by a strong spring-ratchet, which will only allow it to move under a pressure of a given amount.

The ends of the trucks H H' may be made in any convenient manner; but I prefer to give them a concave shape, as shown in the drawings, so that they will grip the car or engine, and thus prevent the trucks A A' from being either forced upward off the track or downward under the car.

From the above description the method of operation of my device will be understood without extended explanation. The device Fig. 1 being fastened at the rear of a train—say at H—in the event of a rear-end collision, the moving train will strike the rear truck at H' and force the rear truck, A', forward, and the plungers C into the air-cylinders B, compressing the air within, which, of course, offers a constantly-increasing resistance to compression, and acts not only to retard the colliding train, but also to start the stationary train in a forward direction.

As will be seen, I am enabled, by placing my air-cylinders and pistons upon independent trucks of their own, to make my cylinders B of considerable length and capacity, so that when the device is struck by a moving train it will take an appreciable time to compress the air in the cylinders and enable the increasing resistance not only to check the moving train, but also to start the stationary one.

This device may be used not only on the rear end of a train, but also at its front; or it may be placed at a crossing, or at any other place where it is important to stop a train.

Where my device is used as a stationary bumping-block it will be most conveniently arranged, as shown in Fig. 3—that is, either the cylinders or the pistons may be attached to a movable track resting on the rails, while the pistons or the cylinders, as the case may be, are attached directly to the ground, as shown at L.

While I have mentioned air as the fluid to be compressed, it is of course obvious that any other elastic and compressible fluid will answer the same purpose.

I am aware that bumpers or buffers have heretofore been attached to cars in which the elasticity of the air, either compressed or uncompressed, has been made use of to counteract a thrust or blow in the same way as an ordinary steel or rubber spring; and I do not claim to be the inventor of such devices.

What I do claim as new, and desire to secure by Letters Patent, is—

1. A device for stopping railway-trains by means of the compression of elastic fluids, which consists of an independent car or structure adapted to close together under violent pressure, and in doing so to compress a volume of such elastic fluid, substantially as shown and described.

2. The combination of the truck A, having cylinders B attached thereto, with a truck or structure having pistons C and rods D attached thereto, all substantially as shown and described.

3. In a device for stopping railway-trains, substantially as shown and described, the combination of the trucks A A' with the draft-chain K, substantially as shown and described.

4. In a device for stopping railway-trains, substantially as shown and described, the combination of the trucks A A' with a yielding brace, I, substantially as shown and described.

5. In a device for stopping railway-trains, substantially as shown and described, the combination of the cylinders B, the piston-rods D, made shorter than the cylinders, and the elastic washers M, all substantially as shown and described.

6. In combination with a device for stopping railway-trains, substantially as shown and described, the jaws or lips H H', adapted to keep the device in proper position, substantially as shown and described.

7. In a device for stopping railway-trains, substantially as shown and described, the combination of the compression-cylinders B with the air-hose G and valve g, all substantially as shown and described.

In testimony whereof I have hereunto set my hand.

JOHN WILLS CLOUD.

Witnesses:
JNO. D. BOWMAN,
BENJ. JOHNSTON.